United States Patent [19]
Keiser

[11] Patent Number: 5,971,880
[45] Date of Patent: Oct. 26, 1999

[54] INFINITELY VARIABLE RATIO TRANSMISSION

[76] Inventor: Fred Keiser, 400 Las Brisas Blvd., Seguin, Tex. 78155

[21] Appl. No.: 09/130,563

[22] Filed: Aug. 7, 1998

[51] Int. Cl.[6] .................................................... F16H 47/04
[52] U.S. Cl. ............................................... 475/83; 475/72
[58] Field of Search ................................. 475/72, 78, 83, 475/86, 82, 93, 99, 116; 418/21

[56] References Cited

U.S. PATENT DOCUMENTS

| | | |
|---|---|---|
| 868,935 | 10/1907 | Munsing . |
| 2,672,565 | 3/1954 | Helmer . |
| 2,842,011 | 7/1958 | Skowron . |
| 2,932,991 | 4/1960 | Zierick . |
| 3,216,284 | 11/1965 | Baker . |
| 3,404,584 | 10/1968 | Trautmann . |
| 3,924,490 | 12/1975 | Mills .......................................... 475/76 |
| 4,138,907 | 2/1979 | Melles .................................... 475/72 X |
| 4,341,132 | 7/1982 | Burdick ..................................... 475/72 |
| 4,409,862 | 10/1983 | Adkins . |
| 4,697,477 | 10/1987 | Barr . |
| 4,890,513 | 1/1990 | Way, Jr. . |
| 4,994,002 | 2/1991 | Valotto et al. . |
| 5,033,994 | 7/1991 | Wu . |
| 5,102,376 | 4/1992 | Batt . |
| 5,201,691 | 4/1993 | Doyle . |
| 5,203,747 | 4/1993 | Warren . |
| 5,512,021 | 4/1996 | Shash . |
| 5,525,116 | 6/1996 | Ra et al. . |
| 5,569,110 | 10/1996 | Warren ...................................... 475/72 |
| 5,584,772 | 12/1996 | Hayd . |
| 5,860,884 | 1/1999 | Jolliff ........................................ 475/89 |

OTHER PUBLICATIONS

Mark Phelan, "Ready–for–Prime–Time CVTs coming to U.S." Global Content, Apr. 1996.
USPTO Web Page (USPN 3,979,972), Sep. 14, 1976.
USPTO Web Page (USPN 4,080,847), Mar. 28, 1978.
USPTO Web Page (USPN 4,729,261), Mar. 8, 1988.
USPTO Web Page (USPN 4,738,160), Apr. 19, 1988.
USPTO Web Page (USPN 5,030,180), Jul. 9, 1991.
USPTO Web Page (USPN 5,171,194), Dec. 15, 1992.
USPTO Web Page (USPN 5,279,527), Jan. 18, 1994.
USPTO Web Page (USPN 5,299,985), Apr. 5, 1994.

*Primary Examiner*—Dirk Wright
*Assistant Examiner*—Peter T. Kwon
*Attorney, Agent, or Firm*—Tobor, Goldstein & Healey, L.L.P.

[57] ABSTRACT

In a broad aspect, the invention is an infinitely variable ratio transmission that may include an input shaft connected to a carrier plate. The input shaft is disposed within the bore of a sun gear. At least one planetary gear is rotatably attached to the carrier plate. A ring gear is connected to an output shaft. The at least one planetary gear is disposed between and meshed with the ring gear and the sun gear. A pump having a first and second gear enclosed within a housing is disposed about the input shaft. The second gear is attached to the sun gear. A pump oil pickup passageway connects an inlet port on the pump to a pump oil reservoir. A pump oil return passageway connects an outlet port of the pump to the reservoir. A control valve is provided to regulate fluid flow through the pump. Various clutch arrangements are disclosed to provide a reverse mode.

33 Claims, 5 Drawing Sheets

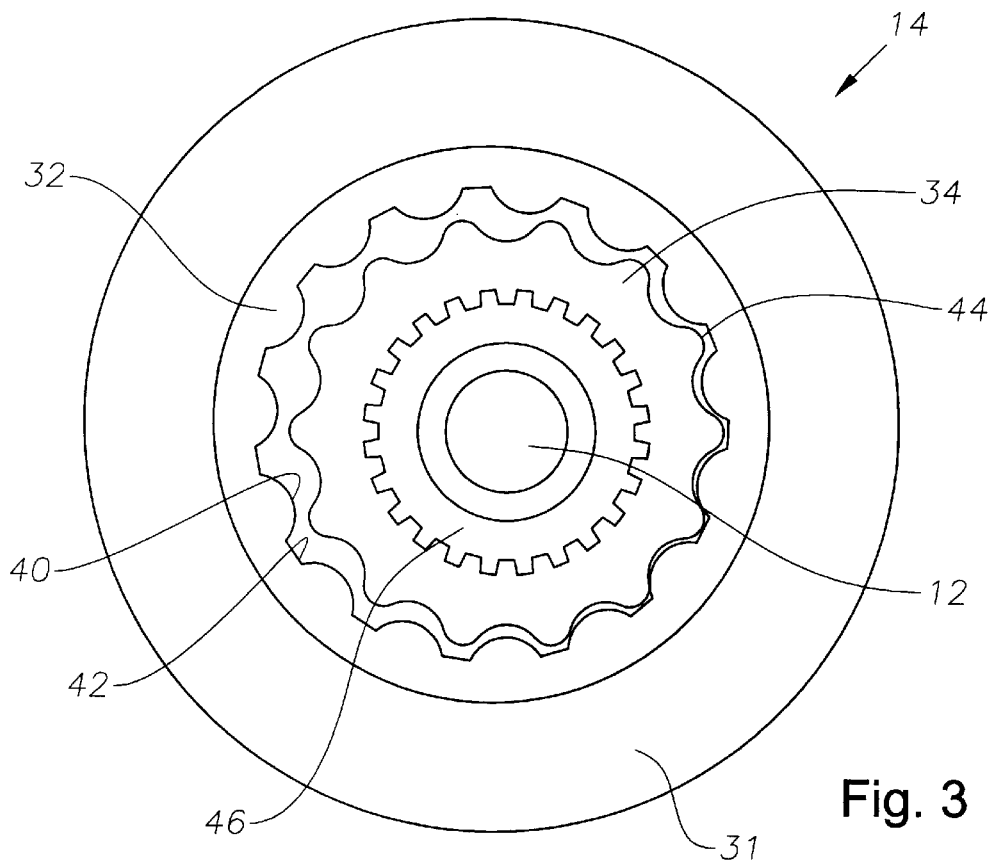
Fig. 3
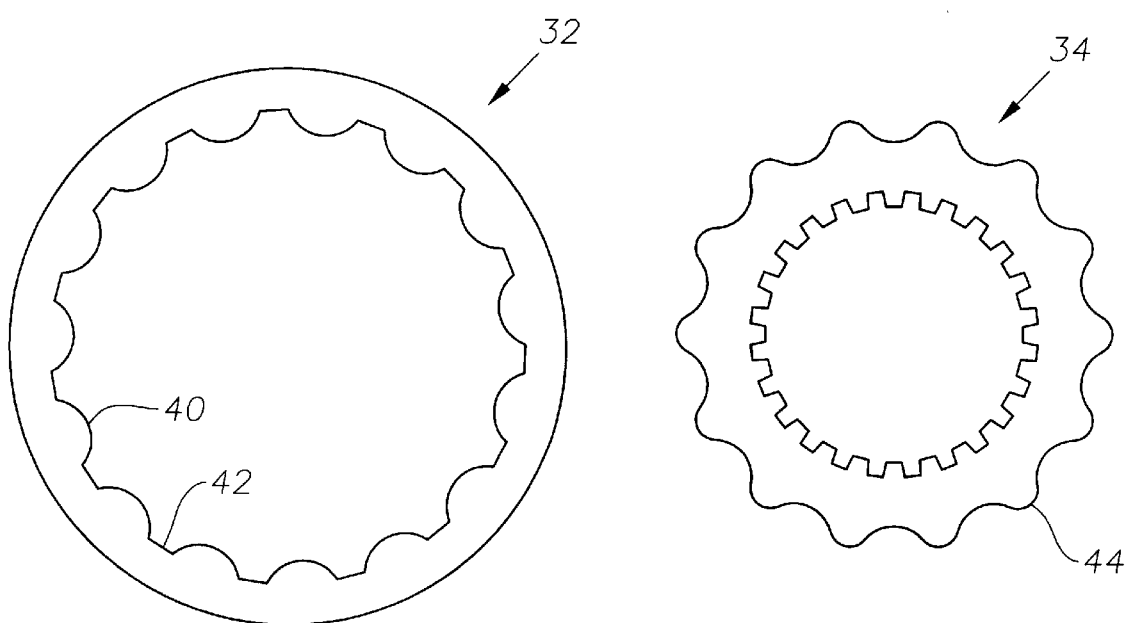
Fig. 4
Fig. 5

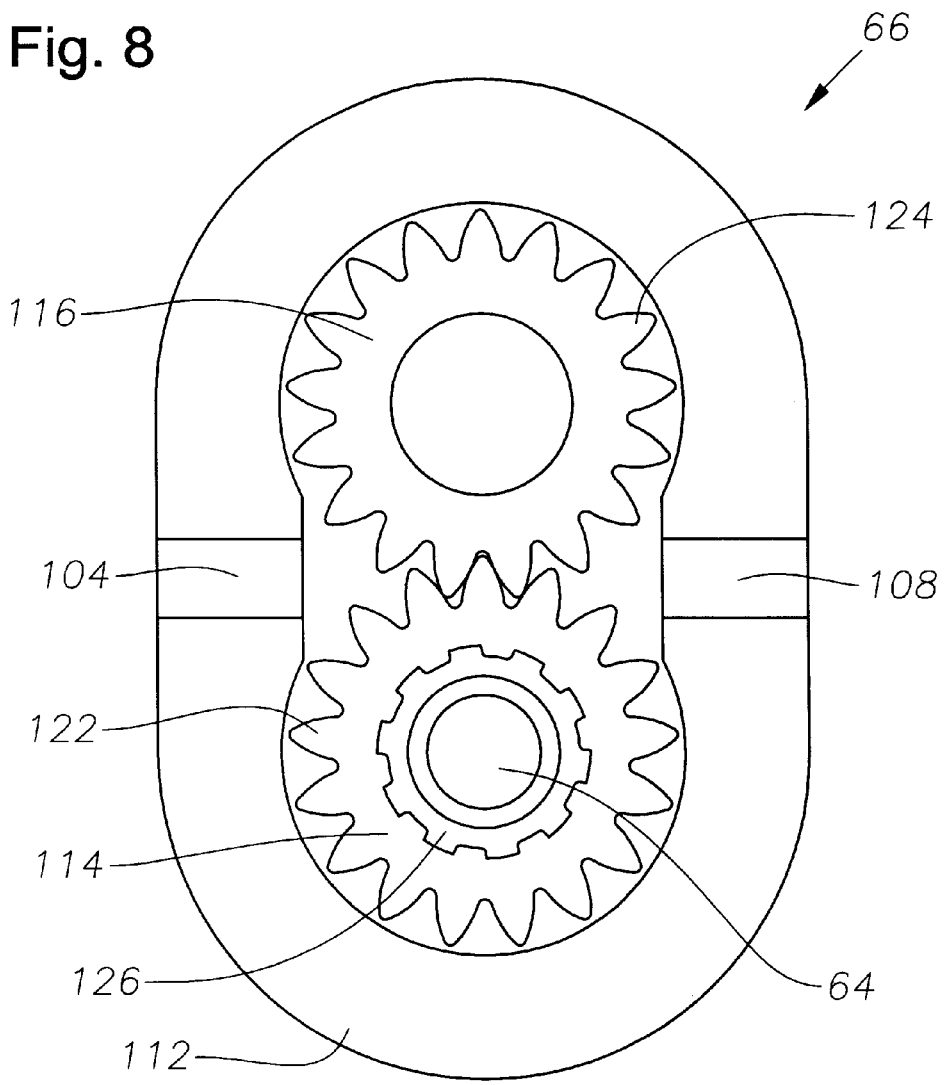

INFINITELY VARIABLE RATIO TRANSMISSION

BACKGROUND OF THE INVENTION

1. Field of the Invention

The present invention relates to transmissions, and more particularly, to an infinitely variable ratio transmission.

2. Description of the Related Art

It is well known that a "transmission" is a mechanical device for transmitting power from a power source, such as an automobile engine or electric motor, to an output shaft or driven member, such as an axle connected to the drive wheels of an automobile. The two basic types of transmissions are manual and automatic, each of which generally transfers power to the output shaft at a multiple of discrete gear ratios. In this regard, automobile transmissions are commonly available as two- to six-speed transmissions, each speed having a different ratio. For reasons well known to those of ordinary skill in the art, it is desirable to provide a transmission with an infinite number of gear ratios, instead of being limited to a specific number of gear ratios. These types of transmissions are commonly referred to as continuously or infinitely variable ratio transmissions (IVRT). There are numerous approaches in the prior art to providing an IVRT, some of which employ a planetary gear set having a carrier plate with a set of pinion gears rotatably attached thereto that are meshed between a sun gear and a ring gear, the operation of which is well known in the art. Some of these approaches that employ planetary gear sets attempt to achieve an IVRT by connecting the power source to the carrier plate through an input shaft and then using some type of mechanism to apply a braking force to the sun gear. Sample types of braking mechanisms used to slow down the sun gear include belt and pulley arrangements, torque converters, gears, clutches, pumps, and motors, or a combination thereof. As more fully explained below, the IVRT of the present invention represents an improvement over IVRTs disclosed in the prior art.

SUMMARY OF THE INVENTION

The present invention has been contemplated to overcome the foregoing deficiencies and meet the above described needs. In a broad aspect, the invention is an infinitely variable ratio transmission comprising: a first shaft having a first end and a second end, the first shaft being disposed within the bore of a sun gear, the second end being connected to a carrier plate; at least one planetary gear rotatably attached to the carrier plate; a ring gear connected to a second shaft, the at least one planetary gear being disposed between and meshed with the ring gear and the sun gear; a pump having an inlet port and an outlet port, the pump being coaxially disposed about the first shaft and coupled to the sun gear; a pump oil pickup passageway connecting the inlet port of the pump to a pump oil reservoir; a pump oil return passageway connecting the outlet port of the pump to the reservoir; and a control valve in fluid communication with the outlet port of the pump for controlling fluid flow therethrough. Another feature of this aspect of the present invention is that the pump is a positive displacement pump. Another feature of this aspect of the present invention is that the pump further includes a pump housing, a first gear, and a second gear, the second gear being coupled to the sun gear. Another feature of this aspect of the present invention is that the first and second gears are disposed within the pump housing. Another feature of this aspect of the present invention is that the second gear is coupled to the sun gear by a connecting shaft. Another feature of this aspect of the present invention is that the inner periphery of the second gear includes a plurality of slots for mating with a plurality of corresponding splines disposed about the connecting shaft. Another feature of this aspect of the present invention is that the second gear and the connecting shaft each includes a slot for receiving a key to couple the second gear to the connecting shaft. Another feature of this aspect of the present invention is that the second gear, the connecting shaft, and the sun gear are an integral component. Another feature of this aspect of the present invention is that the first gear is ring-shaped and provided with a plurality of evenly-spaced, uniform concave ridges about its inner periphery, the ridges defining a plurality of valleys therebetween, and the second gear is ring-shaped and provided with a plurality of evenly-spaced, uniform teeth about its outer periphery for intermittently mating with the valleys on the first gear. Another feature of this aspect of the present invention is that the first and second gears being disposed within the housing with sufficient clearance therebetween to permit fluid to escape the pump to lubricate the transmission.

In another aspect, the present invention may be an infinitely variable ratio transmission comprising: a first shaft having a first end and a second end, the first shaft being disposed within the bore of a sun gear, the second end being connected to a carrier plate; at least one planetary gear rotatably attached to the carrier plate; a ring gear connected to a second shaft, the at least one planetary gear being disposed between and meshed with the ring gear and the sun gear; a pump having a pump housing, a first gear, a second gear, an inlet port, and an outlet port, the first and second gears being disposed within the pump housing and coaxially disposed about the first shaft, the first gear being disposed about the second gear, and the second gear being coupled to the sun gear; a pump oil pickup passageway connecting the inlet port of the pump to a pump oil reservoir; a pump oil return passageway connecting the outlet port of the pump to the reservoir; and a control valve in fluid communication with the outlet port of the pump for controlling fluid flow therethrough. Another feature of this aspect of the present invention is that the second gear is coupled to the sun gear by a connecting shaft. Another feature of this aspect of the present invention is that the inner periphery of the second gear includes a plurality of slots for mating with a plurality of corresponding splines disposed about the connecting shaft. Another feature of this aspect of the present invention is that the second gear and the connecting shaft each includes a slot for receiving a key to couple the second gear to the connecting shaft. Another feature of this aspect of the present invention is that the second gear, the connecting shaft, and the sun gear are an integral component. Another feature of this aspect of the present invention is that the first gear is ring-shaped and provided with a plurality of evenly-spaced, uniform concave ridges about its inner periphery, the ridges defining a plurality of valleys therebetween, and the second gear is ring-shaped and provided with a plurality of evenly-spaced, uniform teeth about its outer periphery for intermittently mating with the valleys on the first gear. Another feature of this aspect of the present invention is that the first gear may be disposed within the housing with sufficient clearance therebetween to permit fluid to escape the pump to lubricate the transmission. Another feature of this aspect of the present invention is that the pump is a positive displacement pump.

In another aspect, the present invention may be an infinitely variable ratio transmission comprising: a first shaft having a first end and a second end, the first shaft being disposed within the bore of a sun gear, the second end being connected to a carrier plate; at least one planetary gear rotatably attached to the carrier plate; a ring gear connected to a second shaft, the at least one planetary gear being disposed between and meshed with the ring gear and the sun gear; means for pumping fluid from a reservoir to apply a braking force to the sun gear; and valve means for regulating fluid flow through the pumping means. Another feature of this aspect of the present invention is that the transmission may further include reversing means for causing the output shaft to rotate in a direction opposite from the direction of rotation of the input shaft.

In another aspect, the present invention may be an infinitely variable ratio transmission comprising: an input shaft having a first end connected to a power source, and a second end connected to a forward clutch; the forward clutch being releasably coupled to a first end of an intermediate shaft disposed within a bore of a sun gear, a second end of the intermediate shaft being connected to a carrier plate; at least one planetary gear rotatably attached to the carrier plate; a ring gear connected to an output shaft, the at least one planetary gear being disposed between and meshed with the ring gear and the sun gear; a first pump connected to the input shaft, the pump having an inlet port and an outlet port, the inlet port being in fluid communication with a reservoir, and the outlet port being in fluid communication with a first control valve having a forward and a reverse mode; a second pump connected to the sun gear and having an inlet port and an outlet port, the outlet port of the second pump being in fluid communication with the reservoir, the inlet port of the second pump being in fluid communication with the outlet port of the first pump when the first control valve is in its reverse mode and with the reservoir when the first control valve is in its forward mode; and a second control valve for regulating fluid flow from the outlet port of the second pump. Another feature of this aspect of the present invention is that the transmission may further include a reverse band releasably disposed about the forward clutch. Another feature of this aspect of the present invention is that fluid communication may be established between the outlet port of the first pump and a reverse band servo when the first control valve is in its reverse mode to engage the reverse band, and fluid communication may be established between the outlet port of the first pump and a forward clutch servo when the first control valve is in its forward mode to engage the forward clutch. Another feature of this aspect of the present invention is that the first control valve includes a first outlet port, a second outlet port, a third outlet port, and a fourth outlet port, the first outlet port establishing fluid communication between the outlet port of the first pump and the reverse band servo when the first control valve is in its reverse mode and exhausting fluid to prohibit actuation of the reverse band servo when the first control valve is in its forward mode, the second outlet port exhausting fluid to prohibit actuation of the forward clutch servo when the first control valve is in its reverse mode and establishing fluid communication between the outlet port of the first pump and the forward clutch servo when the first control valve is in its forward mode, the third outlet port establishing fluid communication between the outlet port of the first pump and the inlet port of the second pump when the first control valve is in its reverse mode and restricting fluid communication between the outlet port of the first pump and the inlet port of the second pump when the first control valve is in its forward mode, the fourth outlet port restricting fluid communication between the outlet port of the first pump and the reservoir when the first control valve is in its reverse mode and establishing fluid communication between the outlet port of the first pump and the reservoir when the first control valve is in its forward mode. Another feature of this aspect of the present invention is that the transmission may further include means for preventing application of pressurized fluid to the forward clutch and reverse band servos above a predetermined pressure. Another feature of this aspect of the present invention is that the transmission may further include a reverse clutch releasably disposed about the forward clutch. Another feature of this aspect of the present invention is that fluid communication is established between the outlet port of the first pump and a reverse clutch servo when the first control valve is in its reverse mode to engage the reverse clutch, and fluid communication is established between the outlet port of the first pump and a forward clutch servo when the first control valve is in its forward mode to engage the forward clutch. Another feature of this aspect of the present invention is that the first control valve includes a first outlet port, a second outlet port, a third outlet port, and a fourth outlet port, the first outlet port establishing fluid communication between the outlet port of the first pump and the reverse clutch servo when the first control valve is in its reverse mode and exhausting fluid to prohibit actuation of the reverse clutch servo when the first control valve is in its forward mode, the second outlet port exhausting fluid to prohibit actuation of the forward clutch servo when the first control valve is in its reverse mode and establishing fluid communication between the outlet port of the first pump and the forward clutch servo when the first control valve is in its forward mode, the third outlet port establishing fluid communication between the outlet port of the first pump and the inlet port of the second pump when the first control valve is in its reverse mode and restricting fluid communication between the outlet port of the first pump and the inlet port of the second pump when the first control valve is in its forward mode, the fourth outlet port restricting fluid communication between the outlet port of the first pump and the reservoir when the first control valve is in its reverse mode and establishing fluid communication between the outlet port of the first pump and the reservoir when the first control valve is in its forward mode. Another feature of this aspect of the present invention is that the transmission may further include means for preventing application of pressurized fluid to the forward clutch servo and the reverse clutch servo above a predetermined pressure. Another feature of this aspect of the present invention is that the transmission may further include a third control valve to permit fluid communication between the inlet port of the second pump and the reservoir when the first control valve is in its forward mode and to prohibit fluid communication between the inlet port of the second pump and the reservoir when the first control valve is in its reverse mode. Another feature of this aspect of the present invention is that the first pump includes a first gear and a second gear enclosed within a housing, the first gear being ring-shaped and provided with a plurality of evenly-spaced, uniform concave ridges about its inner periphery, the ridges defining a plurality of valleys therebetween, and the second gear being ring-shaped and provided with a plurality of evenly-spaced, uniform teeth about its outer periphery for intermittently meshing with the valleys on the first gear. Another feature of this aspect of the present invention is that the second pump includes a first gear and a second gear enclosed within a housing, the first gear being ring-shaped and provided with a plurality of teeth about its outer periphery, and the second gear being ring-shaped and provided with a plurality of teeth about its outer periphery for meshing with the teeth on the first gear.

Another feature of this aspect of the present invention is that the first pump is a positive displacement pump.

BRIEF DESCRIPTION OF THE DRAWINGS

FIG. 3 is a cross-sectional view taken along line 3—3 of FIG. 1.

FIG. 4 is a side elevation view of a first pump gear disposed within a variator pump which forms part of the IVRT shown in FIG. 1.

FIG. 5 is a side elevation view of a second pump gear disposed within the variator pump which forms part of the IVRT shown in FIG. 1.

FIG. 8 is a cross-sectional view taken along line 8—8 of FIGS. 6 and 7.

While the invention will be described in connection with the preferred embodiments, it will be understood that it is not intended to limit the invention to those embodiments. On the contrary, it is intended to cover all alternatives, modifications, and equivalents as may be included within the spirit and scope of the invention as defined by the appended claims.

DETAILED DESCRIPTION OF THE INVENTION

Figure 1:
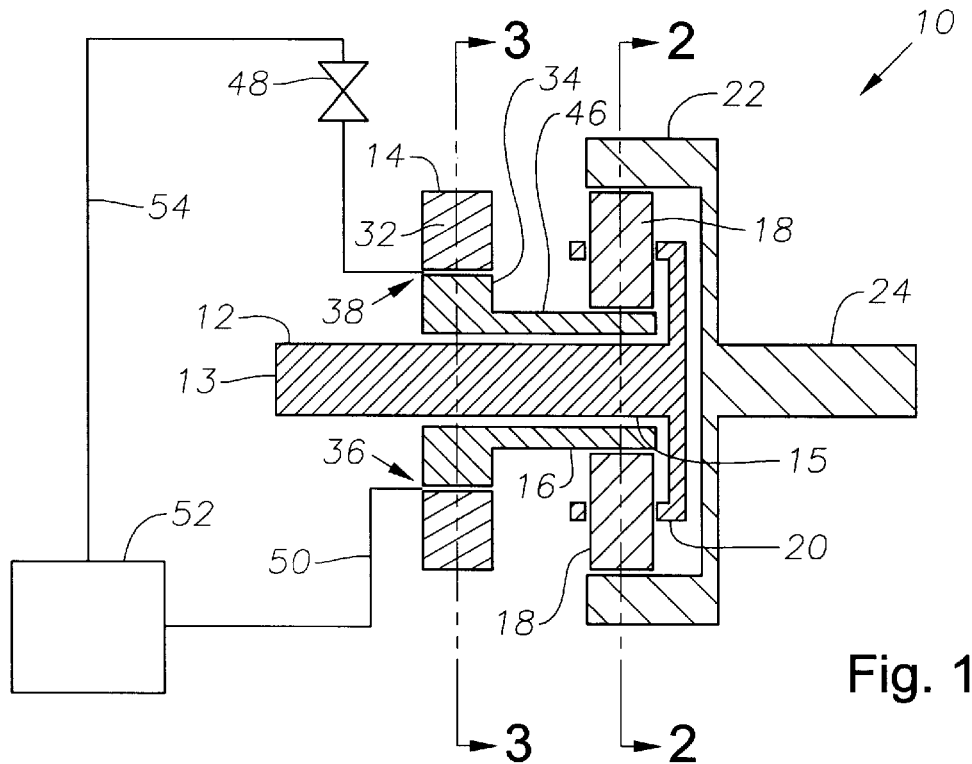
FIG. 1 is a partial cross-sectional side view of a specific embodiment of the infinitely variable ratio transmission (IVRT) of the present invention.
Figure 2:
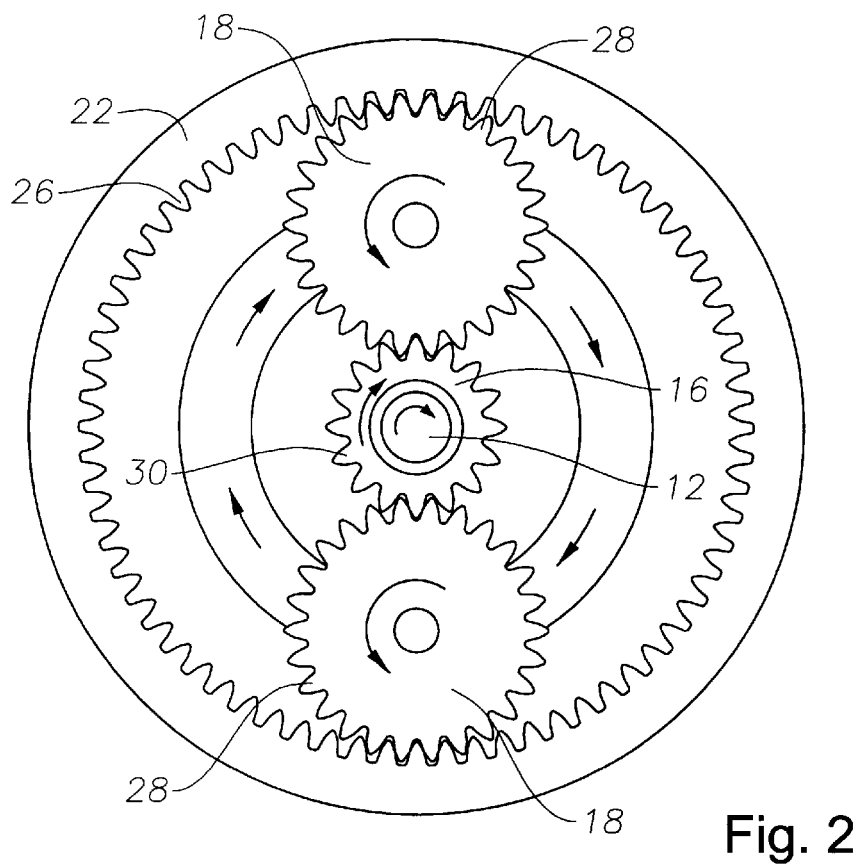
FIG. 2 is a cross-sectional view taken along line 2—2 of FIG. 1.

Referring to the drawings in detail, wherein like numerals denote identical elements throughout the several views, a specific embodiment of an infinitely variable ratio transmission (IVRT) 10 of the present invention is shown in FIG. 1. In this specific embodiment, the IVRT 10 may include an input (or first) shaft 12, a variator pump 14, a sun gear 16, at least one planetary gear 18, a planetary carrier plate 20, a ring gear 22, and an output (or second) shaft 24. A first end 13 of the input shaft 12 is adapted to be connectable to a power source, such as the engine of a car, truck, boat, etc. The input shaft 12 is disposed within a bore of the sun gear 16 and within a bore of the variator pump 14. A second end 15 of the input shaft 12 is fixedly attached to the carrier plate 20. The input shaft 12 is not directly attached to the sun gear 16. The planetary gears 18 are rotatably attached to the carrier plate 20, and are disposed between and meshed with the ring gear 22 and the sun gear 16. As best shown in FIG. 2, which is a cross-sectional view taken along line 2—2 of FIG. 1, the ring gear 22 is provided with a plurality of teeth 26 disposed about its inner periphery for mating with corresponding teeth 28 disposed about the periphery of the planetary gears 18. As shown in FIG. 1, the ring gear 22 is fixedly attached to the output shaft 24. Referring again to FIG. 2, the sun gear 16 is rotatably disposed between the planetary gears 18, and is provided with teeth 30 about its periphery for mating with the teeth 28 disposed about the periphery of the planetary gears 18.

The pump 14 is coaxially mounted to the input shaft 12, and may be any type of positive displacement pump known to those of ordinary skill in the art, such as, for example, a rotary vane pump, a piston pump, an external—external gear pump (see FIG. 8, discussed below), or an external–internal gear pump (see FIG. 3, discussed below). It should be stressed, however, that the present invention is not limited to any particular type of positive displacement pump. In a specific embodiment, the pump 14 may be of the type shown in FIG. 3, which is a cross-sectional view taken along line 3—3 of FIG. 1, and may include a pump housing 31, a first pump gear 32 (see also FIG. 4), and a second pump gear 34 (see also FIG. 5). The first pump gear 32 is disposed about the second pump gear 34. The first and second pump gears 32 and 34 are disposed within the pump housing 31. In this specific embodiment, the first pump gear 32 is ring-shaped and provided with a plurality of evenly-spaced, uniform concave ridges 40 about its inner periphery. The ridges 40 define a plurality of valleys 42 therebetween. The second pump gear 34 is ring-shaped and provided with a plurality of evenly-spaced, uniform teeth 44 about its outer periphery for intermittently mating with the valleys 42 on the first pump gear 32. The second pump gear 34 is coupled to the sun gear 16. In a specific embodiment, as shown in FIG. 1, the second pump gear 34 is coupled to the sun gear 16 by a connecting shaft 46. Referring to FIG. 3, in this embodiment the inner periphery of the second pump gear 34 is provided with a plurality of slots for mating with a plurality of corresponding splines disposed about the connecting shaft 46. In another embodiment, the second pump gear 34 and the connecting shaft 46 may each include a slot for receiving a key to couple the second gear 34 to the connecting shaft 46, in a manner well known to those of ordinary skill in the art. In another specific embodiment, the second pump gear 34, the connecting shaft 46, and the sun gear 16 may be manufactured as a single, integral component. In a preferred embodiment, the pump 14 is provided without any seals and is designed with a minimal clearance between the pump gears 32 and 34 and the housing 31 so as to permit a small volume of oil to escape the pump 14 to lubricate moving parts of the IVRT 10, e.g., the connecting shaft 46, the input shaft 12, the sun gear 16, the planetary gears 18, the carrier plate 20, and the ring gear 22. In a specific embodiment, the minimal clearance may be in the range of 0.002 to 0.005 inches, but this should not be taken as a limitation. Referring back to FIG. 1, the variator pump 14 includes an inlet port 36 and an outlet port 38. A pump oil pickup passageway 50 connects the inlet port 36 to a pump oil reservoir 52. A pump oil return passageway 54 connects the outlet port 38 to the reservoir 52. A control valve 48 is located in the return passageway 54 and is in fluid communication with the outlet port 38 to regulate the flow of fluid through the pump 14. The manner in which the pump 14 operates will be explained below.

To operate the IVRT 10 of the present invention, power is applied to the input shaft 12 which causes the carrier plate 20 to rotate, which causes the planetary gears 18 to "walk" around the inside of the ring gear 22. This causes the sun gear 16 to rotate. Note again that the input shaft 12 is not directly driving the sun gear 16. When the sun gear 16 is caused to rotate, it will cause the second pump gear 34 to rotate, and thereby cause fluid to be drawn from the reservoir 52, into the inlet port 36, and through the pump 14. When power is initially applied to the input shaft 12, and the control valve 48 is completely open, the transmission will be in a neutral condition. Since the control valve 48 is open when the pump is initially activated by the sun gear 16, fluid will freely circulate through the pump 14. No power is transmitted from the input shaft 12 to the output shaft 24 when the control valve 48 is fully open. However, when the control valve 48 is gradually closed to gradually restrict fluid flow through the pump discharge port 38, the pump gears 32 and 34 will gradually lock together and power will gradually be transmitted from the input shaft 12 to the output shaft 24. This action creates an overdrive condition. The gear ratio, or train value, is varied by opening or closing the control valve 48. More particularly, when the control valve 48 is gradually closed to gradually restrict flow through the pump discharge port 38, pressure within the pump 14 gradually increases, and a gradual braking force is thereby applied to the sun gear 16. This creates a speed differential between the sun gear 16 and the planetary gears 18. This differential in speed is transmitted to the ring gear 22 so as to cause the ring gear 22 to begin rotating. As the ring gear 22 begins to rotate, the output shaft 24 also begins to rotate. The amount of power transmitted from the input shaft 12 through the planetary gear set to the output shaft 24 is infinitely variable and directly related to the degree to which the pump 14 applies a braking force to the sun gear 16, which is directly related to the degree to which fluid flow is restricted through the pump discharge port 38 by the control valve 48.

While the IVRT 10 of the present invention has been described above with the input (or first) shaft 12 connected to a power source so that power is transferred from the input (or first) shaft 12 to the output (or second) shaft 24, this should not be taken as a limitation. Instead, the IVRT 10 of the present invention may also be configured so that power is applied to the second shaft 24 and transferred through the IVRT 10 to the first shaft 12. The difference in the operation of these two configurations is that with the first configuration (i.e., power transferred from first shaft 12 to second shaft 24) the IVRT 10 is infinitely variable between neutral and overdrive, whereas with the second configuration (i.e., power transferred from second shaft 24 to first shaft 12) the IVRT 10 is infinitely variable between neutral and a ratio less than one-to-one (i.e., less than 1:1).

Figure 6:
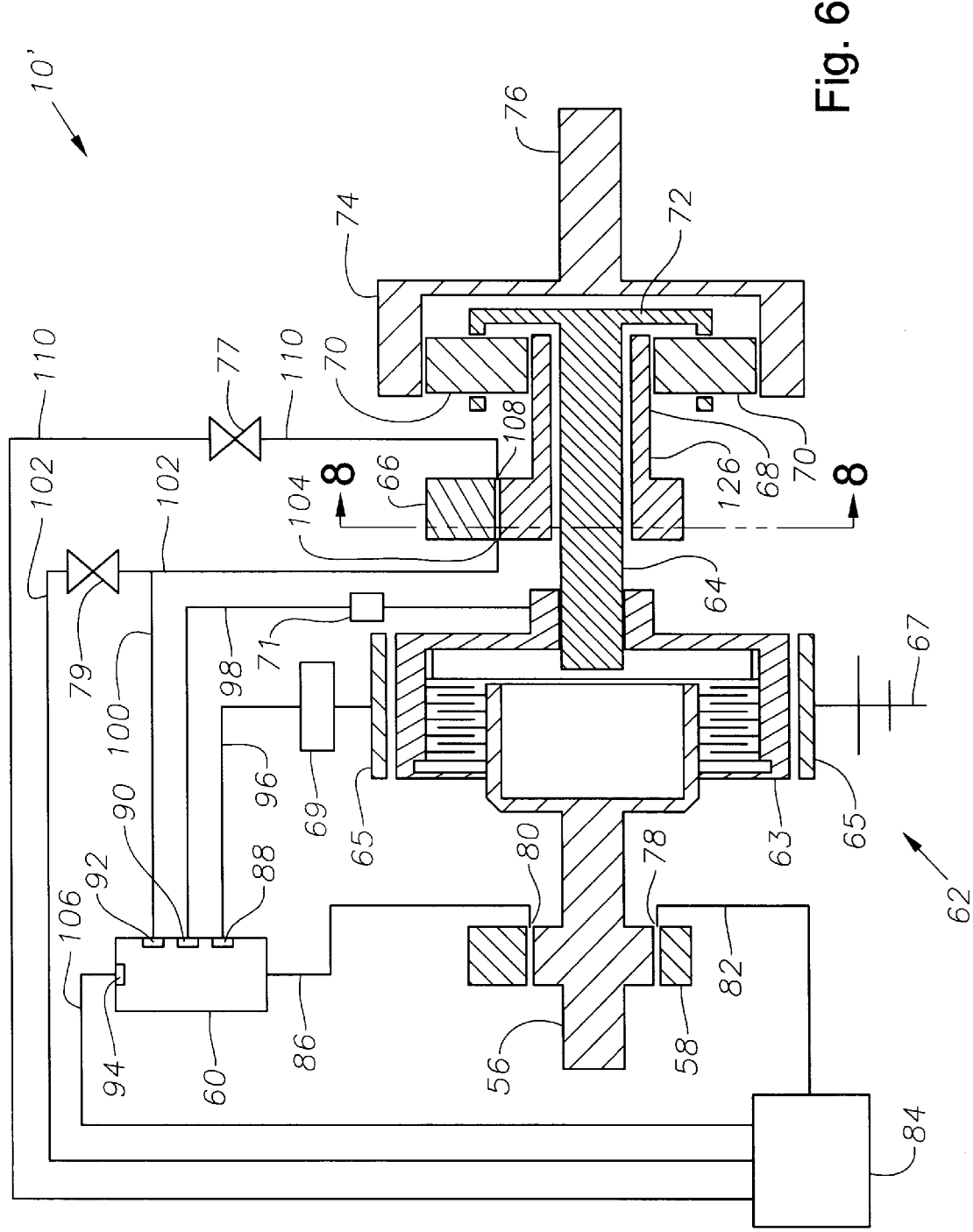
FIG. 6 is a schematic representation of a side elevation view of another specific embodiment of the IVRT of the present invention, and includes a reverse mechanism.
Figure 7:
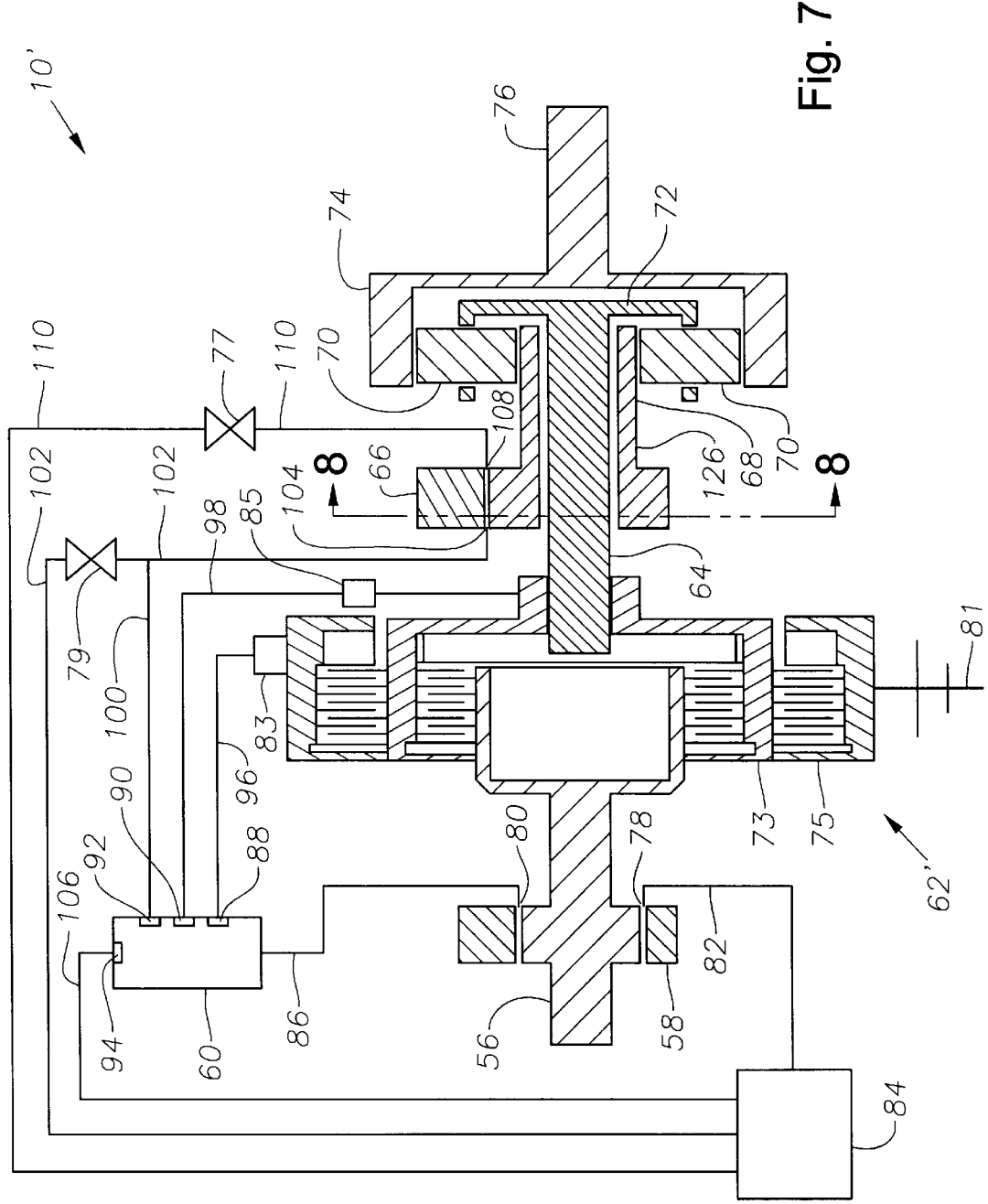
FIG. 7 is a view similar to FIG. 6, showing a schematic representation of a side elevation view of another specific embodiment of the IVRT of the present invention, and includes a reverse mechanism.

FIG. 6 illustrates another embodiment of the IVRT of the present invention. In broad terms, the embodiment shown in FIG. 6 incorporates a reversing mechanism into the embodiment described above and illustrated in FIGS. 1–5. This embodiment of the IVRT, referred to generally by the numeral 10', may include an input shaft 56, a first pump 58, a first control valve 60, a clutch assembly 62, an intermediate shaft 64, a second pump 66, a sun gear 68, at least one planetary gear 70, a planetary carrier plate 72, a ring gear 74, an output shaft 76, a second control valve 77, and a third control valve 79. In a specific embodiment, the clutch assembly 62 may include a forward clutch 63, a reverse band 65 disposed about the clutch 63, a reverse band anchor 67, a reverse band servo 69, and a forward clutch servo 71. In another specific embodiment, as shown in FIG. 7, the clutch assembly 62' may include a forward clutch 73, a reverse clutch 75 engageable with the forward clutch 73, a reverse clutch anchor 81, a reverse clutch servo 83, and a forward clutch servo 85. All other aspects of FIG. 7 are the same as in FIG. 6, as will now be explained. The first pump 58 may be of the type described above (see above discussion of variator pump 14 in relation to FIGS. 3–5), and may include an inlet port 78 and an outlet port 80. The inlet port 78 is in fluid communication with a fluid reservoir 84, which may be established through a first passageway 82. The outlet port 80 is in fluid communication with a first control valve 60, which may be established through a second passageway 86. In a specific embodiment, the first control valve 60 may include four outlet ports, namely a first outlet port 88, a second outlet port 90, a third outlet port 92, and a fourth outlet port 94. The first outlet port 88 is connected by a third passageway 96 to the reverse band servo 69 (or reverse clutch servo 83). The second outlet port 90 is connected by a fourth passageway 98 to the forward clutch servo 71/85. The third outlet port 92 is connected by a fifth passageway 100 to a sixth passageway 102, which connects the reservoir 84 to an inlet port 104 of the second pump 66. The third control valve 79 is connected to the sixth passageway 102 at a point between the reservoir 84 and the intersection of the fifth passageway 100. The fourth outlet port 94 is connected by a seventh passageway 106 to the reservoir 84.

The intermediate shaft 64 is connected to the forward clutch 63/73, is disposed within a bore of the sun gear 68, and is fixedly attached to the carrier plate 72, but not to the sun gear 68. The planetary gears 70 are rotatably attached to the carrier plate 72. The manner in which the sun gear 68, the planetary gears 70 and the ring gear 74 mesh together is the same as described above with regard to FIGS. 1–5. The ring gear 74 is fixedly attached to the output shaft 76. In a specific embodiment, the second pump 66 shown in FIGS. 6 and 7 may be of the type illustrated in FIG. 8, which is sometimes referred to as an external—external gear pump/motor. As already noted above in connection with these embodiments (FIGS. 6 and 7), the second pump 66 includes an inlet port 104. In addition, the second pump 66 includes an outlet port 108, which is connected by an eighth passageway 110 to the reservoir 84. The second control valve 77 is located in the eighth passageway 110 to regulate fluid flow therethrough. Referring to FIG. 8, this embodiment of the second pump 66 may further include a pump housing 112, a first gear 114, and a second gear 116. The first gear 114 may be ring-shaped and provided with a plurality of evenly-spaced teeth 122 about its outer periphery. The second gear 116 may be ring-shaped and provided with a plurality of evenly-spaced teeth 124 about its outer periphery. The first and second gears 114 and 116 are rotatably enclosed within the pump housing 112 such that their respective teeth 122 and 124 are meshed together. As discussed above with regard to the inner periphery of the second pump gear 34 of the variator pump 14 shown in FIGS. 3 and 5, the inner periphery of the first gear 114 of the second pump 66 shown in FIG. 8 may include a splined configuration for mating with a connecting shaft 126 that may connect the first gear 114 to the sun gear 68, as best shown in FIGS. 6 and 7. In a specific embodiment, the sun gear 68, connecting shaft 126, and first gear 114 of the second pump 66 may be provided as a single, integral component. As will be explained more fully below, this embodiment of the second pump 66 may function as a pump or a gear motor.

The operation of these embodiments (FIGS. 6 and 7) of the IVRT will now be described. When power is applied (from a power source, such as an electric motor or the engine of a car, truck, boat, etc.) to the input shaft 56 to cause it to start turning, the pump 58 will start drawing fluid from the reservoir 84 and pumping it under pressure to the first control valve 60. The first control valve 60 determines whether the power being applied to the input shaft 56 will cause the output shaft 76 to rotate in the same or opposite direction as the input shaft 56. In other words, the first control valve 60 is used as a forward/reverse control switch. The forward mode will be described first, followed by a description of the reverse mode.

When the first control valve 60 is set for the forward mode, the first outlet port 88 is closed, the second outlet port 90 is open, the third outlet port 92 is closed, the fourth outlet port 94 is open, and the third control valve 79 is open. As such, the pressurized fluid entering the valve 60 is directed through the second outlet port 90 into the fourth passageway 98 so as to actuate the forward clutch servo 71/85 and thereby engage the forward clutch 63/73. A pressure relief valve may be provided either in the fourth passageway 98 or as part of the valve 60 to limit the magnitude of pressure being applied to the forward clutch servo 71/85. Since the first outlet port 88 is closed, no pressurized fluid is being supplied to the reverse band servo 69 (or reverse clutch servo 83), and therefore the reverse band 65 (or reverse clutch 75) is disengaged. An exhaust valve, such as a spool-type valve, may be provided either in the third passageway 96 or as part of the valve 60 to insure that no pressure is being applied to the reverse band servo 69 (or reverse clutch servo 83) when the valve 60 is set for the forward mode. Since the third outlet port 92 is closed, no pressurized fluid is being supplied into the fifth passageway 100 from the pump 58 through the control valve 60. Since the fourth outlet port 94 is open, any excess pressurized fluid that is entering the first control valve 60 but not going through the second outlet port 90 will be bypassed through the fourth outlet port 94 and fed back into the reservoir 84. To summarize, when the first control valve 60 is set in the forward mode, the forward clutch 63/73 is engaged, and the reverse band 65 (or reverse clutch 75) is disengaged. As such, in the forward mode, power is transferred directly from the input shaft 56 through the forward clutch 63/73 to the intermediate shaft 64. From this point, operation of the IVRT 10' is the same as described above for the IVRT 10 in relation to FIGS. 1–5. To briefly summarize what is explained above in detail with regard to the operation of the IVRT 10, the second control valve 77 may be open when power is first applied to the input shaft 56, in which case the IVRT 10 is in its neutral position. As the intermediate shaft 64 rotates, the carrier 72 will rotate, which will cause the planetary gears 70 to "walk" around the inside of the ring gear 74. This will cause the sun gear 68 to rotate, which will actuate the second pump 66. The second pump 66 will then start drawing fluid from the reservoir 84 through the sixth passageway 102 (recall that the third control valve 79 is open and the third outlet port 92 is closed when the IVRT 10' is in the forward mode) and the second pump 66 will start pumping the fluid through the eighth passageway 110 back to the reservoir 84. As the second control valve 77 is gradually closed, a gradual braking force will be applied to the sun gear 68, and power will gradually be transferred through the planetary gears 70 to the output shaft 76. In this manner, the gear ratio, or train value, may be infinitely varied with the second control valve 77.

When the first control valve 60 is set for the reverse mode, the first outlet port 88 is open, the second outlet port 90 is closed, the third outlet port 92 is open, the fourth outlet port 94 is closed, the second control valve 77 is fully open, and the third control valve 79 is closed. As such, the pressurized fluid entering the valve 60 is directed through the first outlet port 88 into the third passageway 96 so as to actuate the reverse band servo 69 (or reverse clutch servo 83) and thereby engage the reverse band 65 (or reverse clutch 75). A pressure relief valve may be provided either in the third passageway 96 or as part of the valve 60 to limit the magnitude of pressure being applied to the reverse band servo 69 (or reverse clutch servo 83). Since the second outlet port 90 is closed, no pressurized fluid is being supplied to the forward clutch servo 71/85, and therefore the forward clutch 63/73 is disengaged. An exhaust valve, such as a spool-type valve, may be provided either in the fourth passageway 98 or as part of the valve 60 to insure that no pressure is being applied to the forward clutch servo 71/85 when the valve 60 is set for the reverse mode. Since the third outlet port 92 is open, pressurized fluid will also be directed into the fifth passageway 100 and through the sixth passageway 102 into the inlet port 104 of the second pump 66. Since the third control valve 79 is closed when the IVRT 10' is in the reverse mode, none of the pressurized fluid being fed into the sixth passageway 102 will be allowed to flow back to the reservoir 84. In the reverse mode, the second pump 66 turns into a motor to drive the sun gear 68. Recall from above that, in the reverse mode, the forward clutch 63/73 is disengaged, and the reverse band 65 (or reverse clutch 75) is engaged. As such, the intermediate shaft 64 is being held stationary, as is the carrier 72. Therefore, as the second pump 66, acting as a motor, causes the sun gear 68 to rotate, power will be transferred through the planetary gears 70 and ring gear 74 to the output shaft 76. Since the carrier 72 is fixed, the planetary gears 70 will act as idler gears, causing the direction of rotation of the sun gear 68 and the direction of rotation of the ring gear 74 to be opposite, and the output shaft 76 will rotate in a direction opposite of the direction in which the input shaft 56 is rotating. In the reverse mode, the train value becomes constant and the speed of the output shaft 76 becomes a function of (a) the speed of the input shaft 56 and (b) the inherent friction limitations in the hydraulic circuit.

Some of the advantages of the IVRT of the present invention include that it is compact, and it requires a relatively small amount of torque to operate. These advantages are made possible because of the speed differential between the input shaft 12 and the sun gear 16 (see FIG. 1). More specifically, the IVRT may be geared so that one revolution of the input shaft 12 will result in more than one revolution of the sun gear 16. The ratio of input shaft speed to sun gear speed depends on the ratio of the number of teeth 26 on the ring gear 22 (see FIG. 2) to the number of teeth 30 on the sun gear 16, as will readily be understood by those of ordinary skill in the art. As explained above, the way power is transferred from the input shaft 12 to the output shaft 24 is by applying a braking force to the sun gear 16, and the braking force may be applied by using the control valve 48 (see FIG. 1) to restrict the flow of fluid exiting the variator pump 14 through the outlet port 38. However, since the IVRT is geared so that the sun gear 16 rotates faster than the input shaft 12, the torque required to stop the sun gear 16 is less than the torque required to stop the input shaft 12. Stated differently, by overdriving the sun gear 16 relative to the input shaft 12, the torque needed to transfer power from the input shaft 12 to the output shaft 24 is reduced, which allows the use of a smaller, more compact variator pump 14.

Another advantage of the IVRT of the present invention is that it experiences a relatively small amount of losses due to heat and friction during operation. As stated above, during operation, torque is gradually transferred from the input shaft 12 to the output shaft 24 by using the control valve 48 to gradually restrict fluid flow through the variator pump 14. As more and more torque is transferred from the input shaft 12 to the output shaft 24, there is less movement between the pump gears 32 and 34 (i.e., they become more locked together), and less and less fluid flows through the variator pump 14 and through the pump oil passageways 50 and 54. As a result, the amounts of friction and heat generation are reduced.

Other advantages of the IVRT of the present invention include: the gear ratio can be infinitely variable from neutral up through overdrive; the IVRT is more compact, smaller and lighter than previous transmissions; the IVRT has fewer components than conventional transmissions; the IVRT is less expensive to manufacture; the IVRT has greater torque capacity; the IVRT does not require friction clutches or bands for forward motion; the IVRT does not require drive belts or pulleys; the IVRT can be retrofitted to existing vehicles; the IVRT can easily be scaled up or down to meet particular application requirements; the IVRT can be used in wide variety of applications; efficient operation; torsional shock-dampening effect; and improvement of fuel consumption.

It is to be understood that the invention is not limited to the exact details of construction, operation, exact materials or embodiments shown and described, as obvious modifications and equivalents will be apparent to one skilled in the art. For example, the IVRT of the present invention may be provided with a parking brake of any type and in any manner as known to those of ordinary skill in the art. Accordingly, the invention is therefore to be limited only by the scope of the appended claims.

I claim:

1. An infinitely variable ratio transmission comprising:
   a first shaft having a first end and a second end, the first shaft being disposed within a bore of a sun gear, the second end being connected to a carrier plate;
   at least one planetary gear rotatably attached to the carrier plate;
   a ring gear connected to a second shaft, the at least one planetary gear being disposed between and meshed with the ring gear and the sun gear;
   a pump having an inlet port and an outlet port, the pump being coaxially disposed about the first shaft and coupled to the sun gear;
   a pump oil pickup passageway connecting the inlet port of the pump to a pump oil reservoir;
   a pump oil return passageway connecting the outlet port of the pump to the reservoir; and
   a control valve in fluid communication with the outlet port of the pump for controlling fluid flow therethrough.

2. The infinitely variable ratio transmission of claim 1, wherein the pump is a positive displacement pump.

3. The infinitely variable ratio transmission of claim 1, wherein the pump further includes a pump housing, a first gear, and a second gear, the second gear being coupled to the sun gear.

4. The infinitely variable ratio transmission of claim 3, wherein the first and second gears are disposed within the pump housing.

5. The infinitely variable ratio transmission of claim 1, wherein the second gear is coupled to the sun gear by a connecting shaft.

6. The infinitely variable ratio transmission of claim 5, wherein the inner periphery of the second gear includes a plurality of slots for mating with a plurality of corresponding splines disposed about the connecting shaft.

7. The infinitely variable ratio transmission of claim 5, wherein the second gear and the connecting shaft each includes a slot for receiving a key to couple the second gear to the connecting shaft.

8. The infinitely variable ratio transmission of claim 5, wherein the second gear, the connecting shaft, and the sun gear are an integral component.

9. The infinitely variable ratio transmission of claim 3, wherein the first gear is ring-shaped and provided with a plurality of evenly-spaced, uniform concave ridges about its inner periphery, the ridges defining a plurality of valleys therebetween, and the second gear is ring-shaped and provided with a plurality of evenly-spaced, uniform teeth about its outer periphery for intermittently mating with the valleys on the first gear.

10. The infinitely variable ratio transmission of claim 3, the first and second gears being disposed within the housing with sufficient clearance therebetween to permit fluid to escape the pump to lubricate the transmission.

11. An infinitely variable ratio transmission comprising:
    a first shaft having a first end and a second end, the first shaft being disposed within the bore of a sun gear, the second end being connected to a carrier plate;
    at least one planetary gear rotatably attached to the carrier plate;
    a ring gear connected to a second shaft, the at least one planetary gear being disposed between and meshed with the ring gear and the sun gear;
    a pump having a pump housing, a first gear, a second gear, an inlet port, and an outlet port, the first and second gears being disposed within the pump housing and coaxially disposed about the first shaft, the first gear being disposed about the second gear, and the second gear being coupled to the sun gear;
    a pump oil pickup passageway connecting the inlet port of the pump to a pump oil reservoir;
    a pump oil return passageway connecting the outlet port of the pump to the reservoir; and
    a control valve in fluid communication with the outlet port of the pump for controlling fluid flow therethrough.

12. The infinitely variable ratio transmission of claim 11, wherein the second gear is coupled to the sun gear by a connecting shaft.

13. The infinitely variable ratio transmission of claim 12, wherein the inner periphery of the second gear includes a plurality of slots for mating with a plurality of corresponding splines disposed about the connecting shaft.

14. The infinitely variable ratio transmission of claim 12, wherein the second gear and the connecting shaft each includes a slot for receiving a key to couple the second gear to the connecting shaft.

15. The infinitely variable ratio transmission of claim 12, wherein the second gear, the connecting shaft, and the sun gear are an integral component.

16. The infinitely variable ratio transmission of claim 11, wherein the first gear is ring-shaped and provided with a plurality of evenly-spaced, uniform concave ridges about its inner periphery, the ridges defining a plurality of valleys therebetween, and the second gear is ring-shaped and provided with a plurality of evenly-spaced, uniform teeth about its outer periphery for intermittently mating with the valleys on the first gear.

17. The infinitely variable ratio transmission of claim 11, the first gear being disposed within the housing with sufficient clearance therebetween to permit fluid to escape the pump to lubricate the transmission.

18. The infinitely variable ratio transmission of claim 11, wherein the pump is a positive displacement pump.

19. An infinitely variable ratio transmission comprising:
    a first shaft having a first end and a second end, the first shaft being disposed within the bore of a sun gear, the second end being connected to a carrier plate;
    at least one planetary gear rotatably attached to the carrier plate;
    a ring gear connected to a second shaft, the at least one planetary gear being disposed between and meshed with the ring gear and the sun gear;
    means for pumping fluid from a reservoir to apply a braking force to the sun gear; and
    valve means for regulating fluid flow through the pumping means.

20. The infinitely variable ratio transmission of claim 19, further including reversing means for causing the output shaft to rotate in a direction opposite from the direction of rotation of the input shaft.

21. An infinitely variable ratio transmission comprising:
an input shaft having a first end connected to a power source, and a second end connected to a forward clutch;
the forward clutch being releasably coupled to a first end of an intermediate shaft disposed within a bore of a sun gear, a second end of the intermediate shaft being connected to a carrier plate;
at least one planetary gear rotatably attached to the carrier plate;
a ring gear connected to an output shaft, the at least one planetary gear being disposed between and meshed with the ring gear and the sun gear;
a first pump connected to the input shaft, the pump having an inlet port and an outlet port, the inlet port being in fluid communication with a reservoir, and the outlet port being in fluid communication with a first control valve having a forward and a reverse mode;
a second pump connected to the sun gear and having an inlet port and an outlet port, the outlet port of the second pump being in fluid communication with the reservoir, the inlet port of the second pump being in fluid communication with the outlet port of the first pump when the first control valve is in its reverse mode and with the reservoir when the first control valve is in its forward mode; and
a second control valve for regulating fluid flow from the outlet port of the second pump.

22. The infinitely variable ratio transmission of claim 21, further including a reverse band releasably disposed about the forward clutch.

23. The infinitely variable ratio transmission of claim 22, wherein fluid communication is established between the outlet port of the first pump and a reverse band servo when the first control valve is in its reverse mode to engage the reverse band, and fluid communication is established between the outlet port of the first pump and a forward clutch servo when the first control valve is in its forward mode to engage the forward clutch.

24. The infinitely variable ratio transmission of claim 23, wherein the first control valve includes a first outlet port, a second outlet port, a third outlet port, and a fourth outlet port, the first outlet port establishing fluid communication between the outlet port of the first pump and the reverse band servo when the first control valve is in its reverse mode and exhausting fluid to prohibit actuation of the reverse band servo when the first control valve is in its forward mode, the second outlet port exhausting fluid to prohibit actuation of the forward clutch servo when the first control valve is in its reverse mode and establishing fluid communication between the outlet port of the first pump and the forward clutch servo when the first control valve is in its forward mode, the third outlet port establishing fluid communication between the outlet port of the first pump and the inlet port of the second pump when the first control valve is in its reverse mode and restricting fluid communication between the outlet port of the first pump and the inlet port of the second pump when the first control valve is in its forward mode, the fourth outlet port restricting fluid communication between the outlet port of the first pump and the reservoir when the first control valve is in its reverse mode and establishing fluid communication between the outlet port of the first pump and the reservoir when the first control valve is in its forward mode.

25. The infinitely variable ratio transmission of claim 23, further including means for preventing application of pressurized fluid to the forward clutch and reverse band servos above a predetermined pressure.

26. The infinitely variable ratio transmission of claim 21, further including a reverse clutch releasably disposed about the forward clutch.

27. The infinitely variable ratio transmission of claim 26, wherein fluid communication is established between the outlet port of the first pump and a reverse clutch servo when the first control valve is in its reverse mode to engage the reverse clutch, and fluid communication is established between the outlet port of the first pump and a forward clutch servo when the first control valve is in its forward mode to engage the forward clutch.

28. The infinitely variable ratio transmission of claim 27, wherein the first control valve includes a first outlet port, a second outlet port, a third outlet port, and a fourth outlet port, the first outlet port establishing fluid communication between the outlet port of the first pump and the reverse clutch servo when the first control valve is in its reverse mode and exhausting fluid to prohibit actuation of the reverse clutch servo when the first control valve is in its forward mode, the second outlet port exhausting fluid to prohibit actuation of the forward clutch servo when the first control valve is in its reverse mode and establishing fluid communication between the outlet port of the first pump and the forward clutch servo when the first control valve is in its forward mode, the third outlet port establishing fluid communication between the outlet port of the first pump and the inlet port of the second pump when the first control valve is in its reverse mode and restricting fluid communication between the outlet port of the first pump and the inlet port of the second pump when the first control valve is in its forward mode, the fourth outlet port restricting fluid communication between the outlet port of the first pump and the reservoir when the first control valve is in its reverse mode and establishing fluid communication between the outlet port of the first pump and the reservoir when the first control valve is in its forward mode.

29. The infinitely variable ratio transmission of claim 26, further including means for preventing application of pressurized fluid to the forward clutch servo and the reverse clutch servo above a predetermined pressure.

30. The infinitely variable ratio transmission of claim 21, further including a third control valve to permit fluid communication between the inlet port of the second pump and the reservoir when the first control valve is in its forward mode and to prohibit fluid communication between the inlet port of the second pump and the reservoir when the first control valve is in its reverse mode.

31. The infinitely variable ratio transmission of claim 21, wherein the first pump includes a first gear and a second gear enclosed within a housing, the first gear being ring-shaped and provided with a plurality of evenly-spaced, uniform concave ridges about its inner periphery, the ridges defining a plurality of valleys therebetween, and the second gear being ring-shaped and provided with a plurality of evenly-spaced, uniform teeth about its outer periphery for intermittently meshing with the valleys on the first gear.

32. The infinitely variable ratio transmission of claim 21, wherein the second pump includes a first gear and a second gear enclosed within a housing, the first gear being ring-shaped and provided with a plurality of teeth about its outer periphery, and the second gear being ring-shaped and provided with a plurality of teeth about its outer periphery for meshing with the teeth on the first gear.

33. The infinitely variable ratio transmission of claim 21, wherein the first pump is a positive displacement pump.

* * * * *